United States Patent
Lan et al.

(10) Patent No.: US 10,793,686 B2
(45) Date of Patent: Oct. 6, 2020

(54) PREPARATION METHOD OF VINYL ESTER RESIN FOR OPTIMIZING HEAT-RELEASE DURING CURING

(71) Applicant: National Chung-Shan Institute of Science and Technology, Taoyuan (TW)

(72) Inventors: Yi-Kang Lan, New Taipei (TW); Shyh-Jang Sun, Taoyuan (TW); Cheng-Huan Wang, Taipei (TW); Jr-Jeng Ruan, Tainan (TW); Yung-Chin Chien, Yunlin County (TW); Kai-Chia Yeh, Taipei (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 125 days.

(21) Appl. No.: 16/212,693

(22) Filed: Dec. 7, 2018

(65) Prior Publication Data

US 2020/0181337 A1  Jun. 11, 2020

(51) Int. Cl.
*C08L 33/04* (2006.01)
*C08L 57/00* (2006.01)
(Continued)

(52) U.S. Cl.
CPC ............ *C08J 3/21* (2013.01); *C08J 5/043* (2013.01); *C08K 5/03* (2013.01); *C08K 5/08* (2013.01); *C08K 5/09* (2013.01); *C08K 5/14* (2013.01); *C08L 33/06* (2013.01); *C08F 6/10* (2013.01); *C08F 18/04* (2013.01); *C08F 18/10* (2013.01); *C08F 20/26* (2013.01); *C08F 20/32* (2013.01);
(Continued)

(58) Field of Classification Search
None
See application file for complete search history.

(56) References Cited

U.S. PATENT DOCUMENTS

2009/0148575 A1* 6/2009 Lang-Wittkowski .... C09D 7/69
                                                                 426/392
2012/0022187 A1* 1/2012 Desbois ................ C08G 69/24
                                                                 524/35
(Continued)

FOREIGN PATENT DOCUMENTS

CN   107417867 A  * 12/2017
EP     3623422 A1 *  3/2020  ............ C08G 59/20

OTHER PUBLICATIONS

Sarier, N. et al. "The manufacture of microencapsulated phase change materials suitable for the design of thermally enhanced fabrics". Thermochimica Acta 2007, 452(2), 149-160. (Year: 2007).*

*Primary Examiner* — Richard A Huhn
(74) *Attorney, Agent, or Firm* — Winston Hsu

(57) ABSTRACT

A preparation method of vinyl ester resin for optimizing heat-release during curing includes: (A) providing a vinyl ester, a solvent and a phase change material to perform mixture; (B) performing a heating process to remove the solvent, so as to obtain a vinyl ester resin containing the phase change material. Thereby, the organic PCM material with high heat absorption and good resin affinity can be used as the temperature control agent of the vinyl ester resin during the curing process for avoiding the defects such as bubbles and cracks being generated in the vinyl ester resin.

10 Claims, 3 Drawing Sheets

(51) Int. Cl.
*C08F 22/10* (2006.01)
*C08K 5/01* (2006.01)
*C08K 5/03* (2006.01)
*C08K 5/053* (2006.01)
*C08K 5/08* (2006.01)
*C08K 5/09* (2006.01)
*C08K 5/11* (2006.01)
*C08K 5/20* (2006.01)
*C08J 3/21* (2006.01)
*C08J 5/04* (2006.01)
*C08L 33/06* (2006.01)
*C08K 5/14* (2006.01)
*C08J 3/09* (2006.01)
*C08F 20/32* (2006.01)
*C08F 18/04* (2006.01)
*C08F 20/26* (2006.01)
*C08F 18/10* (2006.01)
*C08F 6/10* (2006.01)
*C08F 22/20* (2006.01)

(52) U.S. Cl.
CPC .......... *C08F 22/1006* (2020.02); *C08F 22/20* (2013.01); *C08J 3/095* (2013.01); *C08J 2333/06* (2013.01); *C08K 5/01* (2013.01); *C08K 5/053* (2013.01); *C08K 5/11* (2013.01); *C08K 5/20* (2013.01); *C08L 33/04* (2013.01); *C08L 57/00* (2013.01); *C08L 2666/30* (2013.01); *C08L 2666/32* (2013.01); *C08L 2666/34* (2013.01); *C08L 2666/36* (2013.01); *C08L 2666/66* (2013.01)

(56) References Cited

U.S. PATENT DOCUMENTS

2014/0178485 A1\* 6/2014 Champagne ......... A61K 9/5026
424/497
2019/0388861 A1\* 12/2019 Walters .................... A61K 8/87

\* cited by examiner

PREPARATION METHOD OF VINYL ESTER RESIN FOR OPTIMIZING HEAT-RELEASE DURING CURING

BACKGROUND OF THE INVENTION

1. Field of the Invention

The present invention relates to a preparation method of a vinyl ester resin, and more particularly to a preparation method of the vinyl ester resin for optimizing heat-release during curing.

2. Description of the Prior Art

Vinyl ester resin has been used in a wide range, the application fields include offshore wind turbines, yachts, ships, masts, and SONAR dome, etc., and vinyl ester resin is massively used in these application fields. Vinyl ester resin is a resin formed by esterification of an epoxy resin with an unsaturated monocarboxylic acid, and its structure is a long chain molecule, wherein the end and the head of the long chain are a vinyl with an unsaturated double bond. In vinyl ester resin, since the vinyl ester has low viscosity, it promotes the epoxy resin which is hard to process, and further, since vinyl ester resin has strong mechanical properties and heat resistance from the epoxy resin, and the methyl group around the molecular chain also gives vinyl ester resin the excellent corrosion resistance, vinyl ester resin can be used in highly corrosive environments.

Vinyl ester resin has excellent mechanical physical properties, heat resistance, processability and corrosion resistance. However, the curing reaction of vinyl ester resin utilizes the free radical for reactively crosslinking, and a lot of bubbles would be reactively generated during the curing reaction, such that the bubbles will exist in the cured vinyl ester resin, which influence the physical properties of vinyl ester resin. Moreover, the rate of the curing reaction of vinyl ester is high, and the release of heat during the curing reaction is greater than heat of reaction of general resin. When the thermal conductivity of the manufacturing model is not good (for example, the manufacturing model is too thick or has a core layer), a lot of released heat may be accumulated, such that the temperature of vinyl ester resin may increase very high during the curing process. Thus, when the temperature changes sharply to cause the uneven curing, the peeling phenomenon and the gap may occur at the interface between vinyl ester resin and other material (such as fiber), so as to decrease the interfacial strength. In another aspect, when the temperature is higher than the thermal deformation temperature of vinyl ester (~110° C.) for a long time, it will cause the interior of the product to be softened or deformed, such that the shrinkage rate is uneven, which generate the problems of interface defects and local stress concentrations.

The conventional existing solution is using the curing agent generating fewer bubbles or adding the bubble elimination agent in the vinyl ester resin to reduce the bubbles during the curing process. However, these existing solutions may increase the production cost. Furthermore, in the preparation process of composite material, because thermal conductivity coefficients of the vinyl ester resin and the material (such as glass fiber) are different, the peeling phenomenon may occur at the interface between the vinyl ester resin and the material, so as to cause the composite material to rupture after being stressed. These problems cannot be solved by the existing solution.

Therefore, the industry greatly needs to develop a preparation method of vinyl ester resin for optimizing heat-release during curing, which can effectively control the reaction temperature and the temperature increasing curve during the curing process of the vinyl ester resin. As the result, it can effectively produce composite material with the excellent mechanical physical properties, the heat resistance, the processability and the corrosion resistance under the condition of reducing cost and maintaining efficiency.

SUMMARY OF THE INVENTION

Regarding the aforementioned disadvantages of the prior art, a main purpose of the present invention is to provide a preparation method of a vinyl ester resin for optimizing heat-release during curing, which integrate a vinyl ester, a solvent, a phase change material and a curing process to prepare a vinyl ester resin which can optimize heat-release during curing.

In order to achieve above purposes, the present invention proposes a solution providing a preparation method of a vinyl ester resin for optimizing heat-release during curing, where steps include: (A) providing a vinyl ester, a solvent and a phase change material to perform mixture; (B) performing a heating process to remove the solvent, so as to obtain a vinyl ester resin containing the phase change material.

The solvent in step (A) may be selected from ethanol or acetone; the phase change material in step (A) may be an organic PCM (phase change material) which may include one or more selected from the group consisting of p-xylene dichloride, methyl fumarate, catechol, quinone, acetanilide, succinic anhydride, benzoic acid, stilbene, benzamide, sebacic acid and adipic acid, wherein a weight mixing ratio of the above phase change material to the vinyl ester ranges from 0.1% to 5%.

In order to achieve the above purposes, the present invention proposes another solution providing a preparation method of a composite material containing a vinyl ester resin, where steps include: (a) providing a vinyl ester resin prepared by the above method, a solvent, a glass fiber, a curing agent and a promoter to perform mixture; (b) performing a curing process to obtain a composite material containing the vinyl ester resin.

The curing agent in step (a) may be a peroxide such as methyl ethyl ketone peroxide (MEKPO) or cyclohexanone peroxide (CHP); the promoter in step (a) may be selected from cobalt salt such as cobalt octoate or cobalt oxalate; the solvent in step (a) may be selected from ethanol or acetone; the phase change material (PCM) in step (a) may be an organic PCM (phase change material) which may include one or more selected from the group consisting of p-xylene dichloride, methyl fumarate, catechol, quinone, acetanilide, succinic anhydride, benzoic acid, stilbene, benzamide, sebacic acid and adipic acid, wherein a weight mixing ratio of the above phase change material to the vinyl ester ranges from 0.1% to 5%.

The above and the following detailed description and drawings are intended to further illustrate the manner, means, and effect of the present invention for achieving predetermined purposes. Other purposes and advantages of the present invention are described in the following detailed description and drawings.

DETAILED DESCRIPTION

Specific examples will be detailed in the follow description to explain an implementation of the present invention. Those skilled in the art can easily understand an advantage and an effect of the present invention from contents disclosed in this specification.

Generally, a curing process of a vinyl ester resin is guided by a curing agent. A peroxide (i.e. the curing agent) is reacted with cobalt to generate a free radical, and then, a free radical copolymerization of the free radical and a double bond of the vinyl ester resin is performed. Surely, heating alone can also have the double bond of the vinyl ester open to generate the primary free radical, thereby causing a chain extending reaction, but there are two disadvantages that cannot be ignored: (1) if the temperature is too low, the startup of the reaction is slow, and if the temperature is too high, the reaction is difficult to control; (2) the instantaneous rate of the startup of the reaction is quick, but the reaction in final may easily be incomplete. In comparison, curing with the curing agent may effectively control the reaction rate and the reaction in final may be completed, and the quality of the product is stable.

The phase change material (PCM) covers organic molecules and inorganic molecules. The present invention utilizes a characteristic of PCM, which is easy crystallization, for controlling the change of the heat of the system during the curing process of the vinyl ester resin by absorbing and releasing heat in the crystallization-melting phase conversion. The addition of PCM not only absorbs the heat released by the resin during the curing process, but also slowly releases heat to slow down the cooling rate after the curing process is completed. Therefore, due to the addition of PCM, the temperature changing rate in the curing process can be reduced, and the highest temperature that can be achieved in the curing process can be controlled, thereby reducing the defects of the product.

Figure 1:
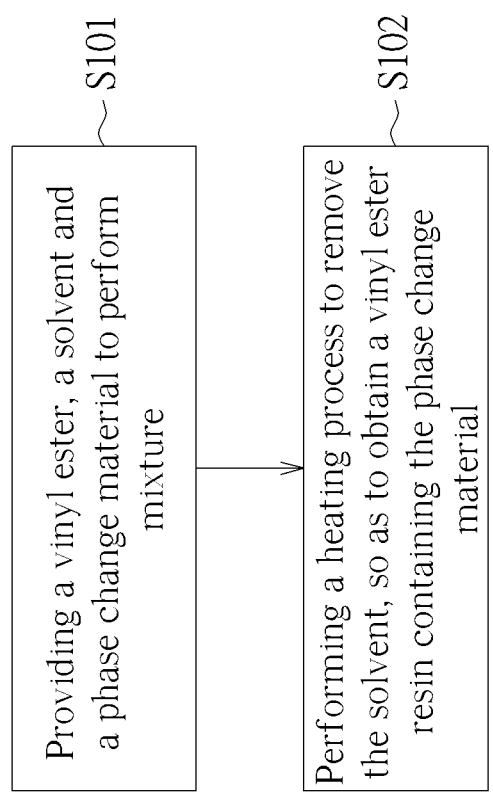
FIG. 1 is a flow diagram illustrating a preparation method of a vinyl ester resin for optimizing heat-release during curing according to the present invention.

Referring to FIG. 1, FIG. 1 is a flow diagram illustrating a preparation method of a vinyl ester resin for optimizing heat-release during curing according to the present invention. As shown in FIG. 1, the present invention provides a preparation method of a vinyl ester resin for optimizing heat-release during curing, where steps are shown as following: step (A) is providing a vinyl ester, a solvent and a phase change material to perform mixture (step S101), wherein in this example, the solvent in step (A) is acetone, and the phase change material in step (A) is adipic acid; step (B) is performing a heating process to remove the solvent, so as to obtain a vinyl ester resin containing the phase change material (step S102).

Figure 2:
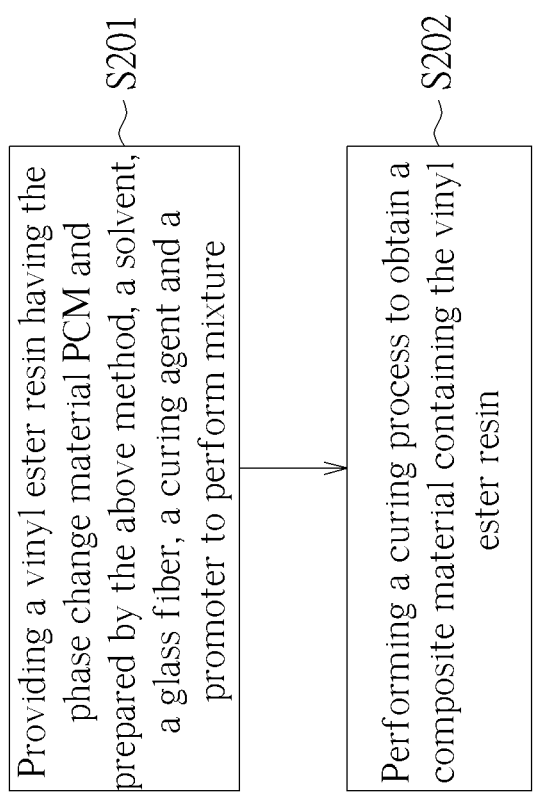
FIG. 2 is a flow diagram illustrating a preparation method of a composite material containing a vinyl ester resin according to the present invention.

Referring to FIG. 2, FIG. 2 is a flow diagram illustrating a preparation method of a composite material containing a vinyl ester resin according to the present invention. As shown in FIG. 2, the present invention provides a preparation method of composite material containing a vinyl ester resin for optimizing heat-release during curing, where steps are shown as following: (a) providing a vinyl ester resin having the phase change material PCM and prepared by the above method, a solvent, a glass fiber, a curing agent and a promoter to perform mixture (step S201), wherein in this example, the curing agent in step (a) is methyl ethyl ketone peroxide (MEKPO), the promoter is cobalt octoate, the solvent is acetone and the phase change material is adipic acid.

In order to verify that the addition of the organic PCM can effectively absorb the heat released by the resin during the curing process and achieve the purpose of decreasing the heating rate and the highest curing temperature, and at the same time, to verify what content ratio of the PCM with the crystal phase may cause the obvious flame retardant effect, the present invention use an example to verify them, the example includes the following steps:

(1) standing the vinyl ester resin containing the organic PCM (i.e. the adipic acid) with different content ratios (total amount in 120 ml) and the reactants, which are the methyl ethyl ketone peroxide (MEKPO), the cobalt octoate and the acetone, etc., in an ice water bath at about 6° C. for 30 minutes respectively;

(2) then, after confirming the temperature equilibrium of all the reactants, mixing the above reactants with the resin and stirring slowly for 15 minutes;

(3) pouring the mixture into a plastic bottle and standing it in an oil bath at approximately 23° C., and then, performing the curing process and a temperature monitoring, so as to know the highest temperature and the curing time in the curing process.

Figure 3:
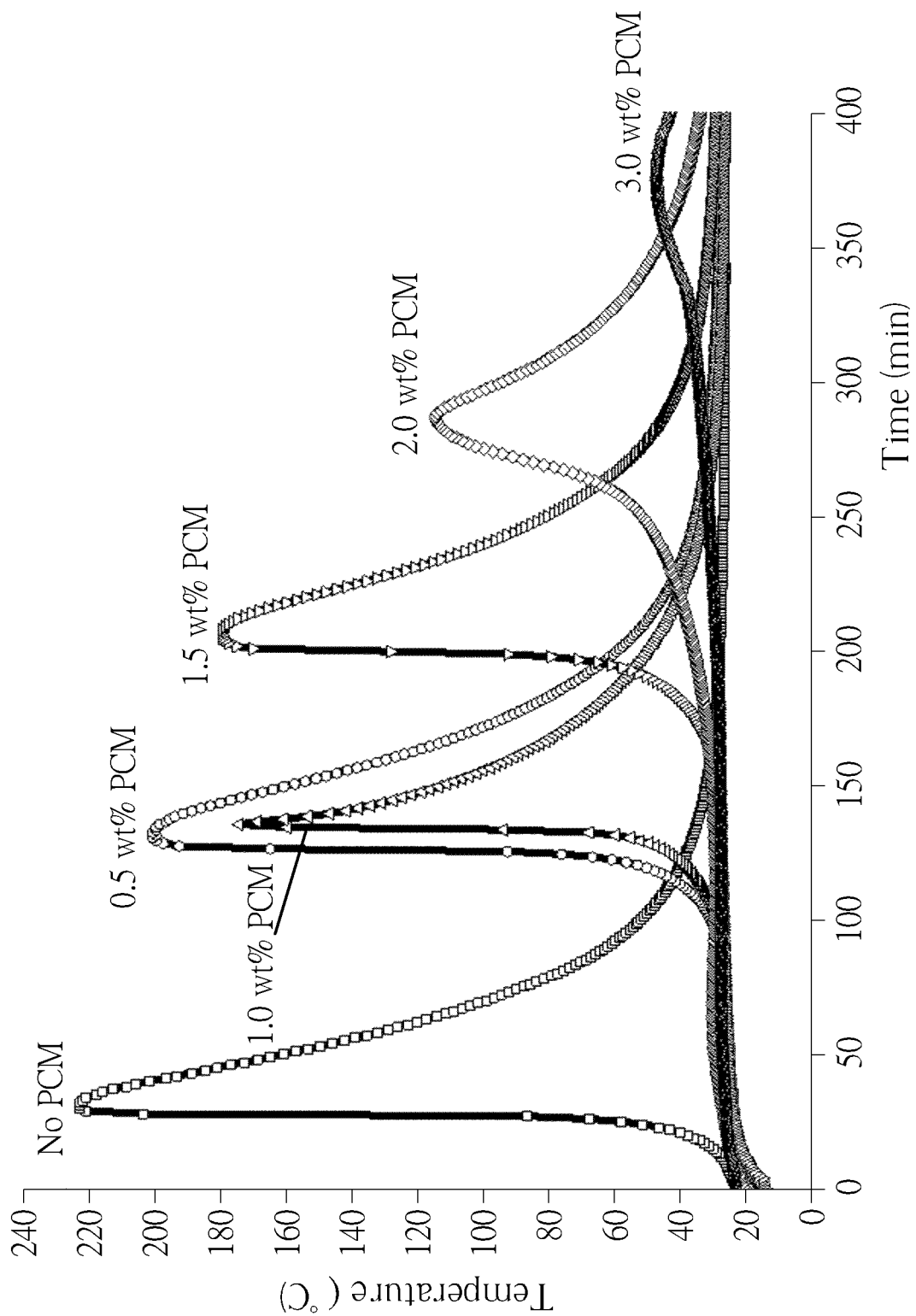
FIG. 3 is a schematic diagram illustrating curing processes of the vinyl ester resins containing PCM (i.e. adipic acid) doped with different content ratios according to the present invention.

Referring to FIG. 3, FIG. 3 is a schematic diagram illustrating the curing processes of the vinyl ester resins containing the PCM (i.e. the adipic acid) doped with different content ratios according to the present invention. As shown in FIG. 3, variation curves show the temperatures of the resins containing the adipic acid with different content ratios during the curing process, wherein each sample contains the curing agent of 5.0 wt % and the cobalt salt of 0.4 wt %. According to FIG. 3, the present example may obtain the Table 1 having content ratio of PCM, the highest curing temperature and the curing start time. It can be discovered that the highest curing temperature is decreased and the curing start time is delayed when mixing the PCM.

TABLE 1

The different content ratio of PCM, the highest curing temperature and the curing start time

| | Content ratio of PCM | | | | | |
|---|---|---|---|---|---|---|
| | 0.0 wt % | 0.5 wt % | 1.0 wt % | 1.5 wt % | 2.0 wt % | 3.0 wt % |
| Highest curing temperature | 222° C. | 200° C. | 173° C. | 179° C. | 114° C. | 47° C. |
| Curing start time | ~20 min | ~115 min | ~120 min | ~185 min | ~240 min | ~300 min |

Referring to Table 2 and Table 3, Table 2 shows the temperature increasing rate during the curing process of this example, and Table 3 shows the time of released heat during the curing process of this example. As shown in Table 2 and Table 3, from the comparison of the total released heat of the reaction, it can be confirmed that adding different content ratios of the PCM only suppresses the highest temperature in the curing process, and does not affect the reaction progress. The total released heat of the reaction may still be maintained, and therefore, it can be indicated that the curing reaction is performed completely and does not affect the demand intensity. Moreover, the PCM doped with different content ratios affects the temperature rising curve in the curing process. Thus, when the composite material is made of the vinyl ester resin and different materials, the content ratios of the PCM may be determined based on the property of the material.

TABLE 2

The temperature increasing rate during the curing process

| | Content ratio of PCM (wt %) | | | | | |
|---|---|---|---|---|---|---|
| | 0.0 | 0.5 | 1.0 | 1.5 | 2.0 | 3.0 |
| Height temperature increasing rate (° C./min) | 116.3 | 71.8 | 65.5 | 41.5 | 3.3 | 0.4 |

TABLE 3

The time of released heat during the curing process of this example

| Content ratio of PCM-A | 0.0 wt % | 0.5 wt % | 1.0 wt % | 1.5 wt % |
|---|---|---|---|---|
| Start time of released heat | 22 min | 88 min | 128 min | 116 min |
| End time of released heat | 148 min | 226 min | 325 min | 387 min |
| Total time of released heat | 126 min | 138 min | 197 min | 271 min |
| Released heat (J/g) | 247.3 | 226.2 | 227.3 | 249.7 |

According to the verification of the example, the present invention can decrease the highest curing temperature and the temperature changing rate during the curing process. Therefore, it can greatly reduce the bubbles and cracks in the resin after curing, form a uniform and fine curing structure, and greatly reduce the defects of the interface between the resin and the material (such as the glass fiber).

The above examples are merely to explain the features and effects of the present invention and not to limit the scope of the present invention. Those skilled in the art will readily observe that numerous modifications and alterations of the device and method may be made without departing from the spirit and scope of the invention. Accordingly, the above disclosure should be construed as limited only by the metes and bounds of the appended claims.

What is claimed is:

1. A preparation method of vinyl ester resin for optimizing heat-release during curing, comprising:
    (A) providing a vinyl ester, a solvent and a phase change material to perform mixture; and
    (B) performing a heating process to remove the solvent, so as to obtain a vinyl ester resin containing the phase change material.

2. The preparation method of vinyl ester resin for optimizing heat-release during curing of claim 1, wherein the solvent is ethanol or acetone.

3. The preparation method of vinyl ester resin for optimizing heat-release during curing of claim 1, wherein the phase change material comprises one or more selected from the group consisting of p-xylene dichloride, methyl fumarate, catechol, quinone, acetanilide, succinic anhydride, benzoic acid, stilbene, benzamide, sebacic acid and adipic acid.

4. The preparation method of vinyl ester resin for optimizing heat-release during curing of claim 1, wherein a weight mixing ratio of the phase change material to the vinyl ester ranges from 0.1% to 5%.

5. A preparation method of composite material containing vinyl ester resin, comprising:
    (a) providing a vinyl ester resin prepared by claim 1, a solvent, a glass fiber, a curing agent and a promoter to perform mixture; and
    (b) performing a curing process to obtain a composite material containing the vinyl ester resin.

6. The preparation method of composite material containing vinyl ester resin of claim 5, wherein the solvent is ethanol or acetone.

7. The preparation method of composite material containing vinyl ester resin of claim 5, wherein the phase change material comprises one or more selected from the group consisting of p-xylene dichloride, methyl fumarate, catechol, quinone, acetanilide, succinic anhydride, benzoic acid, stilbene, benzamide, sebacic acid and adipic acid.

8. The preparation method of composite material containing vinyl ester resin of claim 5, wherein a weight mixing ratio of the phase change material to the vinyl ester ranges from 0.1% to 5%.

9. The preparation method of composite material containing vinyl ester resin of claim 5, wherein the curing agent is methyl ethyl ketone peroxide (MEKPO).

10. The preparation method of composite material containing vinyl ester resin of claim 5, wherein the promoter is cobalt salt.

* * * * *